(12) United States Patent
Meng et al.

(10) Patent No.: US 11,099,425 B2
(45) Date of Patent: Aug. 24, 2021

(54) COLLIMATION BACKLIGHT SOURCE, DISPLAY DEVICE AND DRIVING METHOD THEREOF

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xianqin Meng, Beijing (CN); Xiaochuan Chen, Beijing (CN); Jian Gao, Beijing (CN); Fangzhou Wang, Beijing (CN); Qiuyu Ling, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/643,328

(22) PCT Filed: Aug. 16, 2019

(86) PCT No.: PCT/CN2019/100952
§ 371 (c)(1),
(2) Date: Feb. 28, 2020

(87) PCT Pub. No.: WO2020/048304
PCT Pub. Date: Mar. 12, 2020

(65) Prior Publication Data
US 2021/0072593 A1    Mar. 11, 2021

(30) Foreign Application Priority Data
Sep. 4, 2018    (CN) .......................... 201811026805.8

(51) Int. Cl.
*G02F 1/1335*    (2006.01)
*G02F 1/13357*   (2006.01)
(Continued)

(52) U.S. Cl.
CPC .. *G02F 1/133603* (2013.01); *G02F 1/133524* (2013.01); *G02F 1/134309* (2013.01);
(Continued)

(58) Field of Classification Search
CPC .................................................. G02F 1/133603
See application file for complete search history.

(56) References Cited

U.S. PATENT DOCUMENTS

2017/0168209 A1    6/2017    Shin et al.
2018/0067251 A1    3/2018    Baldwin et al.
(Continued)

FOREIGN PATENT DOCUMENTS

CN    105487239 A    4/2016
CN    106125361 A    11/2016
(Continued)

OTHER PUBLICATIONS

International Search Report of PCT/CN2019/100952, dated Nov. 22, 2019, 16 pages.

*Primary Examiner* — Sang V Nguyen
(74) *Attorney, Agent, or Firm* — Muncy, Geissler, Olds and Lowe, P.C.

(57) ABSTRACT

The present disclosure provides a collimation backlight source, a display device and a driving method thereof. The collimation backlight source includes a light guide plate, a plurality of light sources of different colors, and a light-extraction grating assembly in each light-extraction region on the surface of the light guide plate.

15 Claims, 2 Drawing Sheets

(51) Int. Cl.
*G02F 1/1343* (2006.01)
*G02F 1/1362* (2006.01)

(52) U.S. Cl.
CPC .. *G02F 1/136209* (2013.01); *G02F 1/133613* (2021.01); *G02F 2201/07* (2013.01); *G02F 2201/305* (2013.01)

(56) References Cited

U.S. PATENT DOCUMENTS

| | | | |
|---|---|---|---|
| 2018/0188440 A1* | 7/2018 | Fattal | G02B 6/0023 |
| 2018/0321500 A1 | 11/2018 | Chen et al. | |
| 2019/0121171 A1* | 4/2019 | Tan | G02F 1/133553 |
| 2019/0302515 A1 | 10/2019 | Tan et al. | |
| 2019/0339566 A1* | 11/2019 | Tan | G02F 1/133615 |

FOREIGN PATENT DOCUMENTS

| | | | | |
|---|---|---|---|---|
| CN | 106896513 A | | 6/2017 | |
| CN | 107624163 A | | 1/2018 | |
| CN | 107797338 A | | 3/2018 | |
| CN | 107817629 | * | 3/2018 | ......... G02F 1/13357 |
| CN | 107817629 A | | 3/2018 | |
| CN | 108319070 A | | 7/2018 | |
| CN | 109031736 A | | 12/2018 | |
| JP | H0950015 A | | 2/1997 | |

* cited by examiner

COLLIMATION BACKLIGHT SOURCE, DISPLAY DEVICE AND DRIVING METHOD THEREOF

CROSS-REFERENCE TO RELATED APPLICATIONS

This application is the U.S. national phase of PCT Application PCT/CN2019/100952 filed on Aug. 16, 2019, which claims the benefit and priority of Chinese Application 201811026805.8, filed on Sep. 4, 2018, the disclosures of which are incorporated herein by reference in their entirety.

TECHNICAL FIELD

The present disclosure relates to the field of display technologies, and in particular to a collimation backlight source, a display device, and a driving method thereof.

BACKGROUND

For in-plane-switching liquid crystal display devices, light rays emitted from a light source have to pass through two polarizers, thus the transmittance is low and the power consumption is high. In order to solve the above technical problem, a collimation light source display technology is introduced in the related art. However, the collimation light source display technology in the related art usually provides light rays of single color, and cannot provide colored light rays.

SUMMARY

One embodiment of the present disclosure provides a collimation backlight source including:

a plurality of light sources of different colors, wherein the light sources of different colors emit light rays of different colors;

a light guide plate; wherein the light guide plate includes a surface and a lateral side adjacent to the surface, and the light rays emitted by the light sources of different colors are sequentially incident into the light guide plate from the lateral side and are transmitted in a total reflection manner;

a light-extraction grating assembly in each of a plurality of light-extraction regions on the surface of the light guide plate; wherein the light-extraction grating assembly projects light rays of all colors transmitted in the light guide plate onto a corresponding irradiation area of a light-receiving surface by diffraction.

Optionally, each light-extraction region includes a plurality of spaced light-extraction sub-regions;

the light-extraction grating assembly includes a first light-extraction grating set in each light-extraction sub-region; the collimation backlight source further includes a first buffer layer covering the first light-extraction grating set; a refractive index of the first buffer layer is less than a refractive index of the light guide plate;

the first light-extraction grating set in each light-extraction sub-region includes:

a first electrode and a second electrode on the light guide plate; wherein the first electrodes of adjacent two light-extraction sub-regions are insulated from each other;

a first light-extraction grating on the first electrode or the second electrode; wherein the first light-extraction grating is between the first electrode and the second electrode, and the first light-extraction grating is a step grating;

first liquid crystal filled between the first electrode and the second electrode; wherein the first electrode and the second electrode are configured to form an electric field that drives the first liquid crystal in each light-extraction sub-region to deflect, thereby controlling a refractive index of the first liquid crystal to be the same as or different from a refractive index of the first light-extraction grating;

when the refractive index of the first light-extraction grating is the same as the refractive index of the first liquid crystal, the first light-extraction grating is in a direct light transmission state;

for one light-extraction sub-region, when the refractive index of the first light-extraction grating is different from the refractive index of the first liquid crystal, the first light-extraction grating projects light rays of a certain color transmitted in the light guide plate by diffraction; and, for any two light-extraction sub-regions in the same light-extraction region, the first light-extraction gratings in the two light-extraction sub-regions project light rays of different colors transmitted in the light guide plate by diffraction.

Optionally, for each light-extraction region, periods of the first light-extraction gratings in all the light-extraction sub-regions are different;

for each light-extraction sub-region, when the refractive index of the first light-extraction grating is different from the refractive index of the first liquid crystal, the first light-extraction grating directly projects the light rays of a certain color at a diffraction angle of 0° to a corresponding irradiation area of the light receiving surface by diffraction.

Optionally, for each light-extraction region, periods of the first light-extraction gratings in all the light-extraction sub-regions are the same;

for one of the light-extraction sub-regions, when the refractive index of the first light-extraction grating is different from the refractive index of the first liquid crystal, the first light-extraction grating directly projects the light rays of a certain color at a diffraction angle of 0° to a corresponding irradiation area of the light receiving surface by diffraction;

for other ones of the light-extraction sub-regions, when the refractive index of the first light-extraction grating is different from the refractive index of the first liquid crystal, the first light-extraction grating projects the light rays of other color at a diffraction angle greater than 0° by diffraction.

Optionally, the light-extraction grating assembly further includes a second light-extraction grating set in each light-extraction region; the second light-extraction grating set is on the first buffer layer and is at a light-emitting side of the first light-extraction grating set;

the second light-extraction grating set in each light-extraction region includes a plurality of second light-extraction gratings; periods of the second light-extraction gratings are different; the second light-extraction gratings are in other ones of the light-extraction sub-regions in a one-to-one manner; the light rays projected at a diffraction angle greater than 0° by the first light-extraction grating in corresponding light-extraction sub-region, are further diffracted by the second light-extraction grating by diffraction and are projected at a diffraction angle of 0° to a corresponding irradiation area of the light receiving surface;

the second light-extraction grating is a step grating.

Optionally, the light-extraction grating assembly includes a third light-extraction grating in each light-extraction region; periods of the third light-extraction gratings in all the light-extraction regions are the same;

the collimation backlight source further includes a second buffer layer covering the third light-extraction grating; a refractive index of the second buffer layer is less than a refractive index of the light guide plate;

for each light-extraction region, the third light-extraction grating projects light rays of all colors transmitted in the light guide plate by diffraction; the third light-extraction grating directly projects by diffraction, the light rays of a certain color at a diffraction angle of 0° to a corresponding irradiation area of the light receiving surface by diffraction, and projects the light rays of other color at a diffraction angle greater than 0°;

the light-extraction grating assembly further includes a plurality of fourth light-extraction gratings in each light-extraction region; the fourth light-extraction gratings are on the second buffer layer and at a light-emitting side of the third light-extraction grating;

periods of the fourth light-extraction gratings in each light-extraction region are different; the third light-extraction grating is a step grating, and the fourth light-extraction grating is a step grating;

for each light-extraction region, by diffraction, each fourth light-extraction grating diffracts light rays of one color, which are from the light rays of other colors projected at a diffraction angle greater than 0° by the third light-extraction grating, and projects the light rays of one color onto a preset irradiation area; the fourth light-extraction gratings in each light-extraction region sequentially diffract by diffraction, the light rays of other colors projected at a diffraction angle greater than 0° by the third light-extraction grating, and project the light rays of other colors onto preset irradiation areas.

Optionally, the first light-extraction grating is composed of a plurality of light-transmission stripes arranged at equal intervals, and space between two adjacent light-transmission stripes is transparent.

Optionally, in the first light-extraction grating set in each light-extraction sub-region, the first light-extraction grating is in the first liquid crystal.

Optionally, the light-extraction grating assembly in each light-extraction region is on a light emitting surface of the light guide plate.

One embodiment of the present disclosure provides a display device including: a display panel and a backlight source; wherein the display panel includes a plurality of pixel regions; the display panel includes a cell defined by an array substrate and a color filter substrate, and second liquid crystal filled between the array substrate and the color filter substrate; each pixel region of the color filter substrate includes a light-shielding pattern and a light transmission region around the light-shielding pattern; where the backlight source adopts the above collimation backlight source; light-extraction regions of the backlight source are corresponding to positions of the pixel regions in a one-to-one manner;

the display device further includes:

a controller configured to control the light sources of different colors in the backlight source to emit light rays, and control the light-extraction grating assembly in each light-extraction region to project light rays of all colors transmitted in the light guide plate by diffraction; when the second liquid crystal corresponding to one light-extraction region is not deflected, control the light-extraction grating assembly in the one light-extraction region to project the light rays to a region where the light-shielding pattern of the corresponding pixel region on the color film substrate is located; when the second liquid crystal corresponding to one light-extraction region is deflected, the light rays projected by the light-extraction grating assembly in the one light-extraction region, are adjusted by the second liquid crystal and projected onto the light-transmission region of the corresponding pixel region on the color filter substrate, and then are emitted to a display side.

Optionally, the light-extraction region includes a plurality of spaced light-extraction sub-regions; the pixel region includes a plurality of sub-pixel regions;

the light-extraction grating assembly includes a first light-extraction grating set in each light-extraction sub-region;

the controller is configured to, by applying a voltage to a first electrode and a second electrode, control a refractive index of the first liquid crystal in one light-extraction sub-region to be different from a refractive index of light-transmission stripes of the first light-extraction grating, thereby controlling the first light-extraction grating in the one light-extraction sub-region to project light rays of a certain color transmitted in the light guide plate by diffraction; for any two light-extraction sub-regions in the same light-extraction region, control the first light-extraction gratings in the two light-extraction sub-regions to project light rays of different colors transmitted in the light guide plate by diffraction.

One embodiment of the present disclosure provides a driving method of the above display device, including:

controlling the light sources of different colors in the backlight source to sequentially emit light rays, and controlling the light-extraction grating assembly in each light-extraction region to project light rays of all colors transmitted in the light guide plate by diffraction; when the second liquid crystal corresponding to one light-extraction region is not deflected, controlling the light-extraction grating assembly in the one light-extraction region to project the light rays to a region where the light-shielding pattern of the corresponding pixel region on the color film substrate is located; when the second liquid crystal corresponding to one light-extraction region is deflected, adjusting by the second liquid crystal, the light rays projected by the light-extraction grating assembly in the one light-extraction region, and projecting the adjusted light rays onto the light-transmission region of the corresponding pixel region on the color filter substrate for emitting adjusted light rays to a display side.

Optionally, controlling the light-extraction grating assembly in each light-extraction region to project light rays of all colors transmitted in the light guide plate by diffraction, includes:

by applying a voltage to a first electrode and a second electrode, controlling a refractive index of the first liquid crystal in one light-extraction sub-region to be different from a refractive index of the first light-extraction grating, thereby controlling the first light-extraction grating in the one light-extraction sub-region to project light rays of a certain color transmitted in the light guide plate by diffraction; for any two light-extraction sub-regions in the same light-extraction region, controlling the first light-extraction gratings in the two light-extraction sub-regions to project light rays of different colors transmitted in the light guide plate by diffraction.

Optionally, the backlight sources include a red light source, a green light source and a blue light source; each light-extraction region includes a red-light-extraction sub-region, a green-light-extraction sub-region and a blue-light-extraction sub-region; each pixel region includes a red sub-pixel region, a green sub-pixel region and a blue sub-pixel region;

a duration for displaying one frame picture includes a red-image display period, a green-image display period and a blue-image display period; the driving method specifically includes:

during the red-image display period in the duration for displaying one frame picture, controlling the red light source to emit light rays, controlling a refractive index of the first liquid crystal in the red-light-extraction sub-region to be different from a refractive index of light-transmission stripes of the first light-extraction grating while controlling a refractive index of the first liquid crystal in the green-light-extraction sub-region and the blue-light-extraction sub-region to be the same as the refractive index of light-transmission stripes of the first light-extraction grating, thereby controlling the first light-extraction grating in the red-light-extraction sub-region to project red light rays transmitted in the light guide plate by diffraction; meanwhile, controlling the second liquid crystal in the red sub-pixel region to deflect, thereby achieving corresponding grayscale display;

during the green-image display period in the duration for displaying one frame picture, controlling the green light source to emit light rays, controlling a refractive index of the first liquid crystal in the green-light-extraction sub-region to be different from the refractive index of light-transmission stripes of the first light-extraction grating while controlling a refractive index of the first liquid crystal in the red-light-extraction sub-region and the blue-light-extraction sub-region to be the same as the refractive index of light-transmission stripes of the first light-extraction grating, thereby controlling the first light-extraction grating in the green-light-extraction sub-region to project green light rays transmitted in the light guide plate by diffraction;

during the blue-image display period in the duration for displaying one frame picture, controlling the blue light source to emit light rays, controlling a refractive index of the first liquid crystal in the blue-light-extraction sub-region to be different from the refractive index of light-transmission stripes of the first light-extraction grating while controlling a refractive index of the first liquid crystal in the red-light-extraction sub-region and the green-light-extraction sub-region to be the same as the refractive index of light-transmission stripes of the first light-extraction grating, thereby controlling the first light-extraction grating in the blue-light-extraction sub-region to project blue light rays transmitted in the light guide plate by diffraction.

BRIEF DESCRIPTION OF THE DRAWINGS

In order to illustrate technical solutions according to embodiments of the present disclosure or the related art more clearly, drawings to be used in the description of the embodiments or the related art will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
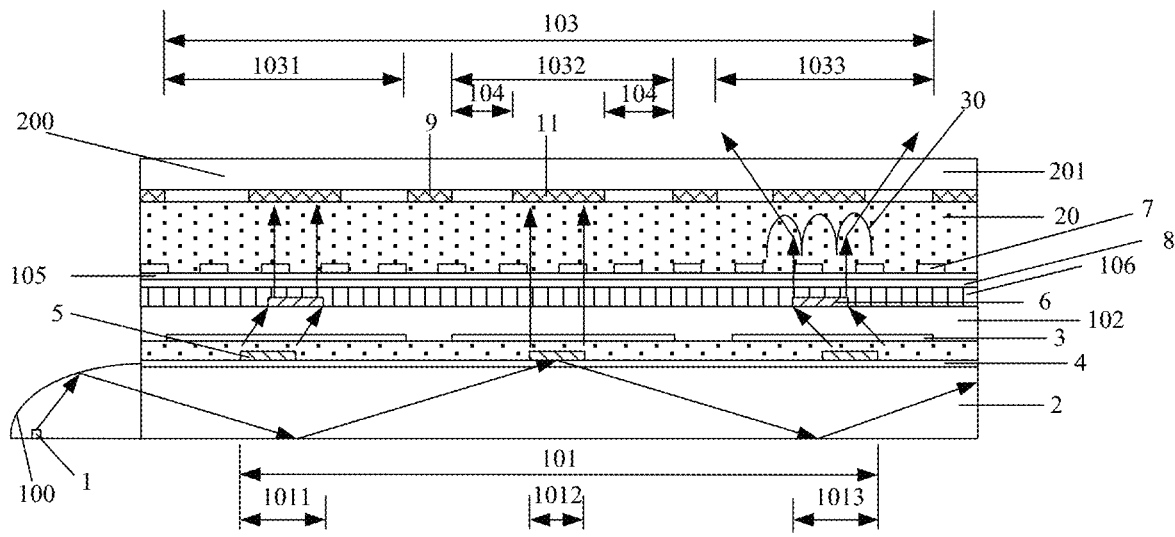
FIG. 1 is a partially schematic view of a display device according to some embodiments of the present disclosure.

In a backlight source of the collimation light source display technology in the related art, light rays emitted from a collimation light source such as an LED light source are coupled by a free-form surface reflector into a light guide plate at a certain central angle, and are transmitted in the light guide plate in a total reflection manner. A light-extraction grating is disposed on a surface of the light guide plate. The light-extraction grating is used to enable light rays, which are transmitted at large angles in the light guide plate in the total reflection manner, to emit from the light guide plate at a collimation angle, thereby achieving a collimation light source with high transmittance. A light-shielding pattern is provided on a color filter substrate at a region corresponding to the light-extraction grating. When no driving electric field is applied, liquid crystals between an array substrate and the color filter substrate are not deflected, and then the collimation light rays are blocked by the light-shielding pattern, thereby achieving dark displaying. When the driving electric field is applied, the liquid crystals between the array substrate and the color filter substrate are deflected with a liquid crystal grating formed, and then the collimation light rays are diffracted by the liquid crystal grating and then emitted out from a light transmission region around the light-shielding pattern, thereby achieving light displaying. By controlling the magnitude of the driving electric field, different diffraction efficiencies of the liquid crystal grating to the collimation light rays can be achieved, thereby achieving different grayscale displaying. However, in the above display structure, the light-extraction grating of the backlight source can only extract collimated light rays of single color, LED can only be a monochromatic light source and cannot provide colored light rays.

In view of this, one embodiment of the present disclosure provides a collimation backlight source which can be applied to a liquid crystal display device. The collimation backlight source can provide display light rays of different colors for the liquid crystal display device, thereby improving display quality of products as compared to the backlight source that can only provide monochromatic light in the related art.

It should be noted that the collimation backlight source of the present disclosure may also be applied to other display device that requires a backlight source, such as a virtual display device and a transparent display device, to provide for the display device with light rays required for displaying. The collimation backlight source of the present disclosure may also be applied to other electronic devices that require collimated light rays.

In order to provide collimated colored light rays, the collimation backlight source of the present disclosure includes multiple light-extraction regions. Each light-extraction region is capable of providing collimated colored light rays.

The collimation backlight source includes:

multiple light sources of different colors, where the light sources of different colors emit light rays of different colors;

a light guide plate, where the light guide plate includes a surface and a lateral side adjacent to the surface, and light rays emitted by the light sources of different colors are sequentially incident into the light guide plate from the lateral side and are transmitted in a total reflection manner;

a light-extraction grating assembly disposed at each light-extraction region on the surface of the light guide plate, where the light-extraction grating assembly projects light rays of all colors transmitted in the light guide plate onto a corresponding irradiation area of a light-receiving surface by diffraction.

By taking its application in a display device as an example, the light-receiving surface may be a plane where a color film substrate is located. When displaying in dark, the irradiation area is in a region where a light-shielding pattern of the color filter substrate is located. When displaying in bright, the irradiation area is in a light transmission region around the light-shielding pattern of the color filter substrate.

In the technical solution of the present disclosure, the light sources of different colors are controlled in a time-division manner to emit light rays, so that light rays of different colors are sequentially incident into the light guide plate and transmitted in a total reflection manner. Further, the light-extraction grating assembly is disposed at each light-extraction region and the light-extraction grating assembly is capable of projecting light rays of all colors transmitted in the light guide plate onto the corresponding irradiation area of the light-receiving surface by diffraction, so that each light-extraction region can provide colored collimation light rays.

When one display device adopts the collimation backlight source of the present disclosure, the light-extraction regions are corresponding to positions of pixel regions in a one-to-one manner. Each light-extraction region can provide colored collimation light rays for the corresponding pixel region, thereby improving the display quality of the product.

A main structure of a liquid crystal display device with the collimation backlight source (which is referred as collimation backlight source liquid crystal display device) includes a collimation backlight source and a display panel. The display panel includes multiple pixel regions. The collimation backlight source includes multiple light-extraction regions. The light-extraction regions are corresponding to positions of pixel regions in a one-to-one manner. Collimation light rays emitted from the collimation backlight source pass through the light-extraction region and are projected onto the corresponding pixel region, so that each light-extraction region can provide colored collimation light rays for the corresponding pixel region.

A main structure of the display panel includes a cell defined by a color filter substrate and an array substrate, and liquid crystals filled between the color filter substrate and the array substrate. The array substrate includes a pixel electrode and a common electrode. The pixel electrode and/or common electrode are slit electrodes for defining a traverse driving electric field that drives liquid crystal molecules to deflect. The color filter substrate includes a black matrix for defining multiple pixel regions. A light-shielding pattern is in each pixel region. An orthographic projection of the light-extraction region onto a plane where the color filter substrate is located, is located in an area where the light-shielding pattern is located. When no driving electric field is applied, liquid crystal molecules are not deflected; and then, the collimation light rays which are emitted from the light-extraction region and projected onto the color filter substrate, are blocked by the light-shielding pattern, thereby achieving dark displaying. When the driving electric field is applied, the liquid crystal molecules are deflected with a liquid crystal grating formed, and then the collimation light rays are diffracted by the liquid crystal grating and then emitted out from a light transmission region around the light-shielding pattern, thereby achieving light displaying. By controlling the magnitude of the driving electric field, different diffraction efficiencies of the liquid crystal grating to the collimation light rays can be achieved, thereby achieving different grayscale displaying.

The working principle of the present disclosure is specifically described with an example, in which each pixel region of the liquid crystal display device includes a red pixel region for transmitting red light rays, a green pixel region for transmitting green light rays and a blue pixel region for transmitting blue light rays.

The duration for displaying one frame picture includes a red-image display period, a green-image display period, and a blue-image display period.

During the red-image display period in the duration for displaying one frame picture, a red light source is controlled to emit light rays, the light-extraction grating assembly projects red light rays transmitted in the light guide plate onto the corresponding irradiation area on the color filter substrate by diffraction. When displaying in dark, no driving electric field is applied to liquid crystals in the display panel, and the liquid crystal molecules are not deflected; the irradiation area is in a region where the light-shielding pattern of the color filter substrate is located. When displaying in bright, the driving electric field is applied to liquid crystals in the display panel, and the liquid crystal molecules are deflected with a liquid crystal grating formed, and then the collimation light rays are diffracted by the liquid crystal grating; the irradiation area is in a light transmission region around the light-shielding pattern of the color filter substrate, and the light rays are emitted to a display side.

During the green-image display period in the duration for displaying one frame picture, a green light source is controlled to emit light rays, the light-extraction grating assembly projects green light rays transmitted in the light guide plate onto the corresponding irradiation area on the color filter substrate by diffraction. When displaying in dark, no driving electric field is applied to liquid crystals in the display panel, and the liquid crystal molecules are not deflected; the irradiation area is in a region where the light-shielding pattern of the color filter substrate is located. When displaying in bright, the driving electric field is applied to liquid crystals in the display panel, and the liquid crystal molecules are deflected with a liquid crystal grating formed, and then the collimation light rays are diffracted by the liquid crystal grating; the irradiation area is in the light transmission region around the light-shielding pattern of the color filter substrate, and the light rays are emitted to the display side.

During the blue-image display period in the duration for displaying one frame picture, a blue light source is controlled to emit light rays, the light-extraction grating assembly projects blue light rays transmitted in the light guide plate onto the corresponding irradiation area on the color filter substrate by diffraction. When displaying in dark, no driving electric field is applied to liquid crystals in the display panel, and the liquid crystal molecules are not deflected; the irradiation area is in the region where the light-shielding pattern of the color filter substrate is located. When displaying in bright, the driving electric field is applied to liquid crystals in the display panel, and the liquid crystal molecules are deflected with a liquid crystal grating formed, and then the collimation light rays are diffracted by the liquid crystal grating; the irradiation area is in the light transmission region around the light-shielding pattern of the color filter substrate, and the light rays are emitted to the display side.

Specific examples of the present disclosure will be further described hereinafter in details with reference to the drawings and embodiments. The following examples are intended to illustrate the present disclosure but are not intended to limit the scope of the present disclosure.

As shown in FIG. 1, in order to provide collimated colored light rays, collimation backlight source provided in one embodiment of the present disclosure includes multiple light-extraction regions 101. Each light-extraction region 101 is capable of providing collimated colored light rays. FIG. 1 is a partially schematic view of a light-extraction region of the collimation backlight source.

The collimation backlight source includes: multiple light sources 1 of different colors, a light guide plate 2, and a light-extraction grating assembly disposed at each light-extraction region 101 on a surface of the light guide plate 2.

The light sources 1 of different colors emit light rays of different colors. Light rays emitted from the light sources 1 may be coupled by a free-form surface reflector into the light guide plate 2 at a certain central angle, so that the light rays are incident into the light guide plate 2 at a large incident angle and can be transmitted in the light guide plate 2 in a total reflection manner. A curved surface of the free-form surface reflector may be a paraboloid of revolution.

The light guide plate 2 includes a surface (which may be referred as a light emitting surface) and a lateral side adjacent to the surface. Light rays emitted by the light sources 1 of different colors are sequentially incident into the light guide plate 2 from the lateral side of the light guide plate 2 and are transmitted in a total reflection manner.

The light-extraction grating assembly projects light rays of all colors transmitted in the light guide plate 2 onto a corresponding irradiation area of a light-receiving surface by diffraction.

The light sources 1 may employ light-emitting diodes (LED). LEDs of different colors are driven in a time-division manner, so that light rays emitted by LEDs of different colors are sequentially incident into the light guide plate 2 from the lateral side of the light guide plate 2. In order to ensure the collimation of light rays transmitted in the light guide plate 2, an LED with a size as small as possible is selected, such as a micro-LED. In order to ensure the collimation of extracted light rays, a micro-LED with a narrow spectral width may be selected. The light sources 1 may also employ organic light-emitting diodes (OLED).

The light guide plate 2 is made of a transparent material with high refractive index, has low haze and weak light absorption. In order to ensure the total reflection transmission effect within the light guide plate 2, there is high requirements for flatness of the surface and a bottom surface opposite to the surface as well as parallelism of the surface and the bottom surface.

In this one embodiment, each light-extraction region 101 includes multiple light-extraction sub-regions that are spaced apart from each other. The light-extraction grating assembly includes a first light-extraction grating set in each light-extraction sub-region. The collimation backlight source further includes a first buffer layer 102 covering the first light-extraction grating set. A refractive index of the first buffer layer 102 is less than a refractive index of the light guide plate 2, thereby ensuring that light rays are transmitted in a total reflection manner in the light guide plate 2. The first buffer layer 102 may be made of resin or polyester compound with good stability.

Figure 2:
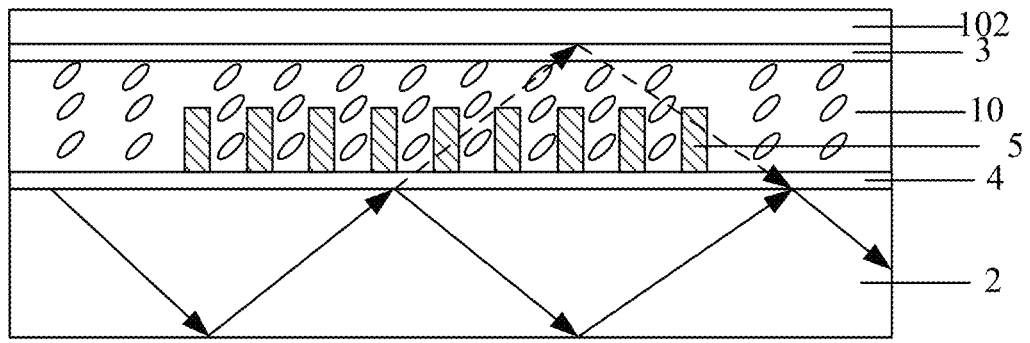
FIG. 2 is a schematic diagram showing a principle of a first light-extraction grating in a light transmission state according to some embodiments of the present disclosure.

The first light-extraction grating set in each light-extraction sub-region includes:

a first electrode 3 and a second electrode 4 disposed on the light guide plate 2, where the first electrodes 3 of adjacent two light-extraction sub-regions are insulated from each other;

a first light-extraction grating 5 disposed on the first electrode 3 or the second electrode 4; where the first light-extraction grating 5 is located between the first electrode 3 and the second electrode 4, and the first light-extraction grating 5 is a step grating and is composed of multiple light-transmission stripes arranged at equal intervals (as shown in FIG. 2), and space between two adjacent light-transmission stripes is transparent;

first liquid crystal 10 (as shown in FIG. 2) filled between the first electrode 3 and the second electrode 4; where the first electrode 3 and the second electrode 4 are used to form an electric field that drives the first liquid crystal 10 in each light-extraction sub-region to deflect, thereby controlling a refractive index of the first liquid crystal 10 to be the same as or different from a refractive index of the light-transmission stripes of the first light-extraction grating 5.

When the refractive index of the first light-extraction grating 5 is the same as the refractive index of the first liquid crystal 10, the first light-extraction grating 5 is in a direct light transmission state.

For one light-extraction sub-region (such as red-light-extraction sub-region 1011, green-light-extraction sub-region 1012 or blue-light-extraction sub-region 1013), when the refractive index of the light-transmission stripes of the first light-extraction grating 5 is different from the refractive index of the first liquid crystal 10, the first light-extraction grating 5 projects light rays of a certain color transmitted in the light guide plate 2 by diffraction. For any two light-extraction sub-regions in the same light-extraction region, the first light-extraction gratings 5 in the two light-extraction sub-regions project light rays of different colors transmitted in the light guide plate 2 by diffraction.

The above first light-extraction grating set uses the liquid crystal to realize a switching function, so that when the first light-extraction grating 5 in one light-extraction sub-region is in a diffraction state, light rays transmitted in the light guide plate 2 is projected through the light-extraction sub-region. While the first light-extraction grating 5 in other light-extraction sub-region is in a light transmission state and the first buffer layer 102 is made of material with a low refractive index, thus light rays are still transmitted in a total reflection manner, and the light rays transmitted in the light guide plate 2 are unable to be projected through the other light-extraction sub-region.

The light-extraction grating assembly including the above first light-extraction grating set uses the liquid crystal to realize a switching function, so that all light-extraction sub-regions in each light-extraction region can sequentially project light rays of all colors transmitted in the light guide plate onto corresponding irradiation areas of the light-receiving surface by diffraction, respectively. For each light-extraction region, by controlling a diffraction angle of the first light-extraction grating located in each light-extraction sub-region, light rays of different colors can be projected onto different irradiation areas of the light-receiving surface.

The diffraction angle may be obtained according to the formula $n_1 \sin\theta_1 - n_2 \sin\theta_2 = m\lambda/P$, where $n_1$ is a refractive index of medium where the incident light rays are located in, $n_2$ is a refractive index of medium where diffracted light rays are located in, $\lambda$ is wavelength of the light rays, $\theta_1$ is an incident angle, i.e., a transmission angle of the light rays in the light guide plate 2, $\theta_2$ is the diffraction angle, and m is a diffraction order, generally taking +1 or −1. The period of the first light-extraction grating 5 is designed according to the required diffraction angle $\theta_2$. Height and duty ratio of the first light-extraction grating 5 may be designed and optimized according to the electromagnetic wave theory to obtain a specific diffraction efficiency.

Figure 3:
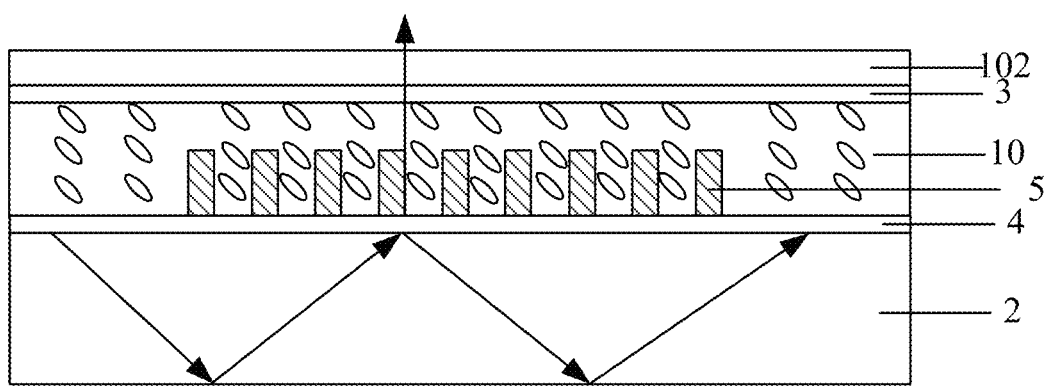
FIG. 3 is a schematic diagram showing a principle of the first light-extraction grating in a diffraction state according to some embodiments of the present disclosure.

As shown in FIG. 2 and FIG. 3, the working principle of the first light-extraction grating set is as follows.

FIG. 2 shows that the first light-extraction grating 5 in one light-extraction sub-region does not provide diffraction effect and is in a light transmission state. At this point, the first liquid crystal 10 is driven by the electric field formed by the first electrode 3 and the second electrode 4, so that a deflection angle of the liquid crystal molecules of the first liquid crystal 10 is the same as a transmission angle of the light rays in the light guide plate 2, and an equivalent refractive index of the first liquid crystal 10 to the light rays is equal to the refractive index of the first light-extraction grating 5. Meanwhile, since the first buffer layer 102 is made of material with a low refractive index, the light rays will continue to be transmitted in a total reflection manner in the light guide plate 2 and the first liquid crystal 10, and the light rays transmitted in the light guide plate 2 are not emitted out from this light-extraction sub-region.

FIG. 3 shows that the first light-extraction grating 5 in one light-extraction sub-region provides diffraction effect and is in a diffraction state. At this point, the first liquid crystal 10 is driven by the electric field formed by the first electrode 3 and the second electrode 4, so that a long axis of the liquid crystal molecules of the first liquid crystal 10 is perpendicular to the incident light rays (this is only a driving state of the first liquid crystal, and the present disclosure also protects other feasible liquid crystal driving state which enables the first light-extraction grating to provide diffraction effect), and an equivalent refractive index of the first liquid crystal 10 to polarized light rays vibrating in a direction parallel to the paper surface is greater than the refractive index of the first light-extraction grating 5, and the first light-extraction grating 5 extracts and projects the light rays transmitted in the light guide plate 2 by time-division diffraction.

In this embodiment, as shown in FIG. 1, for each light-extraction region, periods of the first light-extraction gratings 5 in all the light-extraction sub-regions are the same. For one of the light-extraction sub-regions, when the refractive index of the first light-extraction grating 5 is different from the refractive index of the first liquid crystal 10, the first light-extraction grating 5 directly projects the light rays of a certain color at a diffraction angle of 0° to a corresponding irradiation area of the light receiving surface by diffraction. For other one of the light-extraction sub-regions, when the refractive index of light-transmission stripes of the first light-extraction grating 5 is different from the refractive index of the first liquid crystal 10, the first light-extraction grating 5 projects the light rays of other color at a diffraction angle greater than 0° by diffraction.

In the above technical solution, by setting the periods of the first light-extraction gratings in all the light-extraction sub-regions to be the same, this enables the diffraction angle of the first light-extraction grating in one light-extraction sub-region of one light-extraction region to the light rays of a certain color to be 0°, and enables the diffraction angle of the first light-extraction grating in other light-extraction sub-region of the one light-extraction region to the light rays of other color to be not equal to 0°.

In order to achieve that the diffraction angle of each light-extraction sub-region to light rays of corresponding color is 0°, the light-extraction grating assembly further includes a second light-extraction grating set in each light-extraction region. The second light-extraction grating set is disposed on the first buffer layer 102 and is located at a light-emitting side of the first light-extraction grating set.

The second light-extraction grating set in each light-extraction region 101 includes multiple second light-extraction gratings 6. The second light-extraction grating 6 is a step grating and is composed of multiple light-transmission stripes arranged at equal intervals, and space between two adjacent light-transmission stripes is transparent. Periods of second light-extraction gratings 6 are different, and the second light-extraction gratings 6 are disposed in other light-extraction sub-regions in a one-to-one manner. The light rays projected at a diffraction angle greater than 0° by the light-extraction grating 5 in one light-extraction sub-region, are further diffracted by the corresponding second light-extraction grating 6 in the one light-extraction sub-region and are projected at a diffraction angle of 0° to the corresponding irradiation area of the light receiving surface by diffraction.

In the above technical solution, the light-extraction grating assembly in each light-extraction region includes the first light-extraction grating set and the second light-extraction grating set, so that each light-extraction sub-region can provide collimated light rays with a diffraction angle of 0°. The transmission direction of the light rays of all colors, which are diffracted by the light-extraction sub-regions, is perpendicular to the surface of the light guide plate.

Hereinafter, the technical solution of the present disclosure will be specifically described with an example in which the above backlight source is applied in a liquid crystal display device.

As shown in FIG. 1, the collimation backlight source liquid crystal display device includes a display panel and a collimation backlight source. A main structure of the display panel includes a cell defined by a display substrate and a color filter substrate 200, and second liquid crystal 20 filled between the display substrate and the color filter substrate 200.

Since pixel regions of the display substrate are corresponding to pixel regions of the color filter substrate in a one-to-one manner, display light rays of each pixel region of the display substrate pass through the pixel region at a corresponding position of the color filter substrate and then are emitted to the display side. Therefore, in the following content, for convenience of description and understanding, the pixel region of the display substrate and the pixel region of the color filter substrate are denoted by the same reference numeral.

For convenience of description, each pixel region 103 in the present embodiment includes a red sub-pixel region 1031 for transmitting red light rays, a green sub-pixel region 1032 for transmitting green light rays, and a blue sub-pixel region 1033 for transmitting blue light rays. Then, each light-extraction region 101 of the collimation backlight source includes red-light-extraction sub-region 1011 for providing red light rays, a green-light-extraction sub-region 1012 and a blue-light-extraction sub-region 1013.

It should be noted that color combinations for achieving color display are not limited to red, green and blue, and may include white light rays or other color combinations, which are all applicable to the technical solution of the present disclosure.

The display substrate includes a first base substrate and a pixel electrode 7 disposed in each pixel region 103 on the first base substrate. The display substrate further includes a common electrode 8, and an insulation layer 105 between the pixel electrode 7 and the common electrode 8. The pixel electrode 7 is a slit electrode located at one side of the common electrode 8 close to the second liquid crystal 20. The pixel electrode 7 and the common electrode 8 are used to form an electric field for driving liquid crystal molecules in the second liquid crystal 20 to deflect.

In order to simplify the structure, the first base substrate of the display substrate reuses the light guide plate 2 of the collimation backlight source, and they are the same one.

The color filter substrate 200 includes a second base substrate 201 and a black matrix 9 disposed on the second base substrate 201 for defining the multiple pixel regions 103. The color filter substrate further includes a light-shielding pattern 11 in each pixel region 103, and a light transmission region around the light-shielding pattern 11. Light rays emitted by the collimation backlight source are provided for the pixel regions 103 through the light-extraction regions corresponding to positions of the pixel regions 103 in a one-to-one manner. An orthographic projection of the light-extraction region onto a plane where the color filter substrate 200 is located, is located in an area where the light-shielding pattern 11 is located. When no driving electric field is applied, liquid crystal molecules in the second liquid crystal 20 are not deflected; and then, the collimation light rays which are transmitted through the light-extraction region are blocked by the light-shielding pattern 11, thereby achieving dark displaying. When the driving electric field is applied, the liquid crystal molecules in the second liquid crystal 20 are deflected with a liquid crystal grating 30 formed, and then the collimation light rays are diffracted by the liquid crystal grating 30 and then emitted out from the light transmission region 104 around the light-shielding pattern 11, thereby achieving light displaying. By controlling the magnitude of the driving electric field, different diffraction efficiencies of the liquid crystal grating to the collimation light rays can be achieved, thereby achieving different grayscale displaying.

In order to ensure quality of dark displaying, a contour of the orthographic projection of the light-extraction region 101 onto the plane where the color filter substrate is located, is spaced apart from a contour of the light-shielding pattern 11, so that when no driving electric field is applied, the collimation light rays which are transmitted through the light-extraction region are completely blocked by the light-shielding pattern 11, thereby achieving dark displaying.

The light-shielding pattern 11 and the black matrix 9 may be made from an identical opaque film and are same-layer structures, thereby simplifying the manufacturing process.

The collimation backlight source includes:

a red light source for emitting red light rays, a green light source for emitting green light rays and a blue light source for emitting blue light rays; where light rays emitted from the red light source, the green light source and the blue light source are coupled by a free-form surface reflector 100 into a light guide plate 2 at a certain central angle, so that the light rays are incident into the light guide plate 2 at a large incident angle and can be transmitted in the light guide plate 2 in a total reflection manner;

the light guide plate 2; where the light guide plate 2 includes a surface (which may be referred as a light emitting surface) and a lateral side adjacent to the surface, and light rays emitted by the light sources 1 of different colors are sequentially incident into the light guide plate 2 from the lateral side of the light guide plate 2 and are transmitted in a total reflection manner;

a light-extraction grating assembly disposed in each light-extraction region 101 on the surface of the light guide plate 2.

The light-extraction grating assembly in each light-extraction region 101 includes: a first light-extraction grating set in each light-extraction sub-region and a second light-extraction grating set.

The first light-extraction grating set in each light-extraction sub-region includes:

a first electrode 3 and a second electrode 4 disposed on the light guide plate 2; where the first electrodes 3 of adjacent two light-extraction sub-regions are insulated from each other;

a first light-extraction grating 5 disposed on the first electrode 3 or the second electrode 4; where the first light-extraction grating 5 is located between the first electrode 3 and the second electrode 4, and the first light-extraction grating 5 is a step grating;

first liquid crystal 10 filled between the first electrode 3 and the second electrode 4; where the first electrode 3 and the second electrode 4 are used to form an electric field that drives the first liquid crystal 10 in each light-extraction sub-region to deflect, thereby controlling a refractive index of the first liquid crystal 10 to be the same as or different from a refractive index of the first light-extraction grating 5.

When the refractive index of the first light-extraction grating 5 is the same as the refractive index of the first liquid crystal 10, the first light-extraction grating 5 is in a light transmission state.

For the red-light-extraction sub-region 1011, when the refractive index of the first light-extraction grating 5 is different from the refractive index of the first liquid crystal 10, the first light-extraction grating 5 projects by diffraction, at a diffraction angle greater than 0°, red light rays transmitted in the light guide plate 2.

For the green-light-extraction sub-region 1012, when the refractive index of the first light-extraction grating 5 is different from the refractive index of the first liquid crystal 10, the first light-extraction grating 5 projects by diffraction, at a diffraction angle of 0°, green light rays transmitted in the light guide plate 2.

For the blue-light-extraction sub-region 1013, when the refractive index of the first light-extraction grating 5 is different from the refractive index of the first liquid crystal 10, the first light-extraction grating 5 projects by diffraction, at a diffraction angle greater than 0°, blue light rays transmitted in the light guide plate 2.

The second light-extraction grating set in each light-extraction region 101 includes two second light-extraction gratings 6. The second light-extraction grating 6 is a step grating. Periods of the two second light-extraction gratings 6 are different, and the two second light-extraction gratings 6 are disposed in the red-light-extraction sub-region 1011 and the blue-light-extraction sub-region 1013 in a one-to-one manner.

For the red-light-extraction sub-region 1011, the red light rays projected at a diffraction angle greater than 0° by the light-extraction grating 5, are further diffracted by the corresponding second light-extraction grating 6 and are projected at a diffraction angle of 0° by diffraction.

For the blue-light-extraction sub-region 1013, the blue light rays projected at a diffraction angle greater than 0° by the light-extraction grating 5, are further diffracted by the corresponding second light-extraction grating 6 and are projected at a diffraction angle of 0° by diffraction.

In the above technical solution, the red light source, the green light source and the blue light source are driven in a time-division manner to sequentially emit light rays into the light guide plate 2 with the light rays transmitted in the light guide plate 2 in a total reflection manner. Further, the light-extraction grating assemblies in the red-light-extraction sub-region 1011, the green-light-extraction sub-region 1012 and the blue-light-extraction sub-region 1013 are sequentially controlled to project by diffraction, at a diffraction angle of 0°, red light rays, green light rays and blue light rays transmitted in the light guide plate.

In the displaying process, by controlling whether the second liquid crystal 20 in the red sub-pixel region 1031, the green sub-pixel region 1032 and the blue sub-pixel region 1033 is deflected, the red sub-pixel region 1031, the green sub-pixel region 1032 and the blue sub-pixel region 1033 are controlled to display in a dark state or in a bright state, thereby realizing color display.

In this embodiment, the light-extraction grating assembly is disposed on the surface of the light guide plate 2. The collimation backlight source further includes a planarization layer 106 covering the second light-extraction grating set. The common electrode 8, the insulation layer 105 and the pixel electrode 7 are sequentially disposed on the planarization layer 106.

A refractive index of the planarization layer 106 is less than a refractive index of light-shielding stripes of the second light-receiving grating 6. A thickness of the planarization layer 106 is greater than or equal to 1 um, thereby providing a flat surface.

Correspondingly, a driving method for the above display device in this embodiment includes:

controlling the light sources of different colors in the backlight source to emit light rays, and controlling the light-extraction grating assembly in each light-extraction region to project the light rays of all colors transmitted in the light guide plate by diffraction; when the second liquid crystal corresponding to one light-extraction region is not deflected, the light-extraction grating assembly in the one light-extraction region projects the light rays to the region where the light-shielding pattern of the corresponding pixel region on the color film substrate is located; when the second liquid crystal corresponding to one light-extraction region is deflected, the light rays projected by the light-extraction grating assembly in the one light-extraction region, are adjusted by the second liquid crystal and projected onto the light-transmission region of the corresponding pixel region on the color filter substrate, and then are emitted to the display side.

Specifically, by applying a voltage to the first electrode and the second electrode, the driving method controls a refractive index of the first liquid crystal in one light-extraction sub-region to be different from a refractive index of light-transmission stripes of the first light-extraction grating, thereby controlling the first light-extraction grating in the one light-extraction sub-region to project light rays of a certain color transmitted in the light guide plate by diffraction; for any two light-extraction sub-regions in the same light-extraction region, controlling the first light-extraction gratings in the two light-extraction sub-regions to project light rays of different colors transmitted in the light guide plate by diffraction.

When the backlight sources include a red light source, a green light source and a blue light source, each light-extraction region includes a red-light-extraction sub-region, a green-light-extraction sub-region and a blue-light-extraction sub-region. The duration for displaying one frame picture includes a red-image display period, a green-image display period and a blue-image display period. The driving method specifically includes:

during the red-image display period in the duration for displaying one frame picture, controlling the red light source to emit light rays, controlling a refractive index of the first liquid crystal in the red-light-extraction sub-region to be different from a refractive index of light-transmission stripes of the first light-extraction grating while controlling a refractive index of the first liquid crystal in the green pixel region and the blue pixel region to be the same as the refractive index of light-transmission stripes of the first light-extraction grating, thereby controlling the first light-extraction grating in the red-light-extraction sub-region to project red light rays transmitted in the light guide plate by diffraction;

during the green-image display period in the duration for displaying one frame picture, controlling the green light source to emit light rays, controlling a refractive index of the first liquid crystal in the green-light-extraction sub-region to be different from the refractive index of light-transmission stripes of the first light-extraction grating while controlling a refractive index of the first liquid crystal in the red pixel region and the blue pixel region to be the same as the refractive index of light-transmission stripes of the first light-extraction grating, thereby controlling the first light-extraction grating in the green-light-extraction sub-region to project green light rays transmitted in the light guide plate by diffraction;

during the blue-image display period in the duration for displaying one frame picture, controlling the blue light source to emit light rays, controlling a refractive index of the first liquid crystal in the blue-light-extraction sub-region to be different from the refractive index of light-transmission stripes of the first light-extraction grating while controlling a refractive index of the first liquid crystal in the red pixel region and the green pixel region to be the same as the refractive index of light-transmission stripes of the first light-extraction grating, thereby controlling the first light-extraction grating in the blue-light-extraction sub-region to project blue light rays transmitted in the light guide plate by diffraction.

In the above driving method, by controlling whether the second liquid crystal in the red sub-pixel region, the green sub-pixel region and the blue sub-pixel region is deflected, the red sub-pixel region, the green sub-pixel region and the blue sub-pixel region are controlled to display in a dark state or in a bright state, thereby realizing color display.

Figure 4:
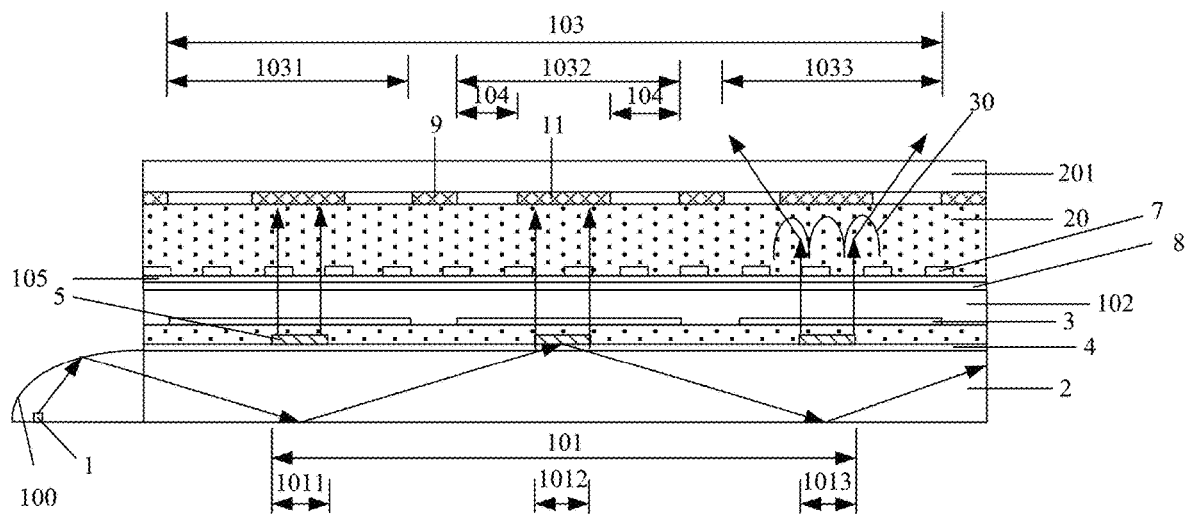
FIG. 4 is a partially schematic view of a display device according to some embodiments of the present disclosure.

One embodiment shown in FIG. 4 is difference from the embodiment shown in FIG. 1 in that for each light-extraction region 101, periods of the first light-extraction gratings 5 in all the light-extraction sub-regions are different. For each light-extraction sub-region, when the refractive index of the first light-extraction grating 5 is different from the refractive index of the first liquid crystal 10, the first light-extraction grating 5 directly projects, at a diffraction angle of 0° by diffraction, the light rays of a certain color onto a corresponding irradiation area of the light receiving surface. In other words, the diffraction angles of all the first light-extraction gratings 5 to the light rays of the corresponding colors are 0°.

It can be seen that, in this embodiment, by setting the periods of the first light-extraction gratings in all the light-extraction sub-regions to be different, the diffraction angles of all the light-extraction sub-regions to the light rays of the corresponding colors are 0°. Then, it is not necessary to dispose the second light-extraction grating in each light-extraction region, thereby simplifying the structure of the product and facilitating for reducing the thickness of the product.

The other structures of the collimation backlight source are the same as those of the embodiment shown in FIG. 1 except for that the periods of the first light-extraction gratings 5 in all the light-extraction sub-regions are different. In addition, the driving method of the display device including the collimation backlight source in this embodiment is also the same as that in the embodiment shown in FIG. 1, which will not be described in details herein.

Figure 5:
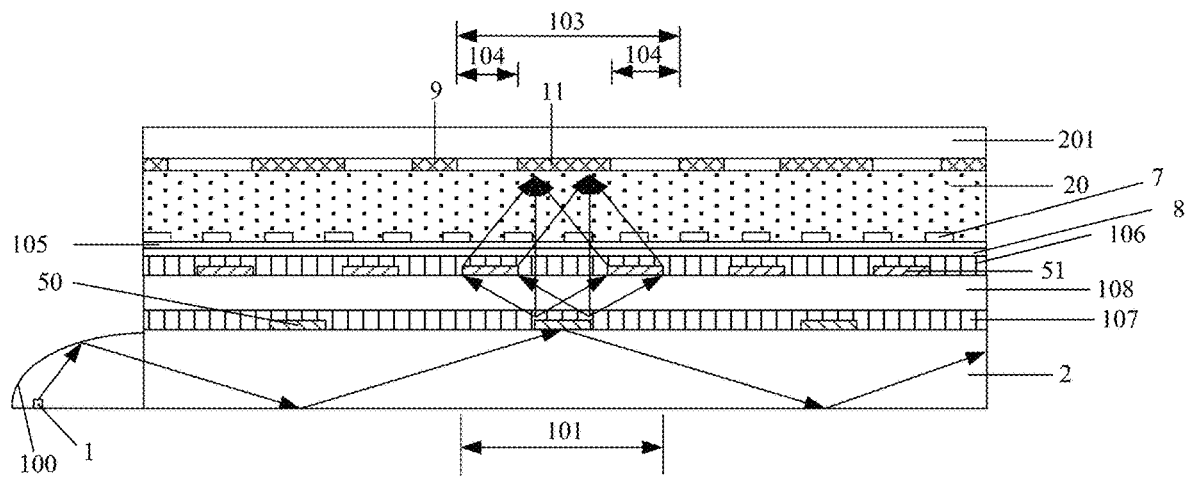
FIG. 5 is a partially schematic view of a display device according to some embodiments of the present disclosure.

One embodiment shown in FIG. 5 is difference from the embodiment shown in FIG. 1 in that the light-extraction region is not divided into multiple light-extraction sub-regions and all light rays of all colors are projected through the same light-extraction region by diffraction. Accordingly, it is not necessary to divide the pixel region of the display device into multiple sub-pixel regions, and it is only necessary to arrange the light-extraction regions to be corresponding to positions of the pixel regions in a one-to-one manner so that light rays transmitted through one light-extraction region are provided form the corresponding pixel region.

As shown in FIG. 5, in the embodiment, the light-extraction grating assembly includes a third light-extraction grating 50 in each light-extraction region 101. The third light-extraction grating 50 is a step grating, and is composed of multiple light-transmission stripes arranged at equal intervals, and space between two adjacent light-transmission stripes is transparent. Periods of the third light-extraction gratings 50 in all the light-extraction regions 101 are the same.

The collimation backlight source further includes a second buffer layer 107 covering the third light-extraction grating 50. A refractive index of the second buffer layer 107 is less than a refractive index of the light guide plate 2, thereby ensuring that light rays are transmitted in a total reflection manner in the light guide plate 2.

For each light-extraction region, the third light-extraction grating 50 projects light rays of all colors transmitted in the light guide plate 2 by diffraction. The third light-extraction grating 50 directly projects the light rays of a certain color at a diffraction angle of 0° to a corresponding irradiation area of the light receiving surface by diffraction, and projects the light rays of other color at a diffraction angle which is not equal to 0° by diffraction.

The light-extraction grating assembly includes multiple fourth light-extraction gratings 51 in each light-extraction region 101. The fourth light-extraction grating 51 is a step grating, and is composed of multiple light-transmission stripes arranged at equal intervals, and space between two adjacent light-transmission stripes is transparent. A third buffer layer 108 is disposed on the second buffer layer 107. The multiple fourth light-extraction gratings 51 are disposed on the third buffer layer 108, and located at a light-emitting side of the third light-extraction grating 50.

Periods of the multiple fourth light-extraction gratings 51 in each light-extraction region 101 are different.

For each light-extraction region, by diffraction, each fourth light-extraction grating 51 diffracts light rays of one color, which are from the light rays of other colors projected at a diffraction angle greater than 0° by the third light-extraction grating 50, and projects the light rays of one color onto the preset irradiation area. The multiple fourth light-extraction gratings 51 in each light-extraction region 101 sequentially diffract by diffraction, the light rays of other colors projected at a diffraction angle greater than 0° by the third light-extraction grating 50, and project the light rays onto the preset irradiation areas.

In the above technical solution, each of the third light-extraction grating and the fourth light-extraction grating of the light-extraction grating assembly is a step grating, and the periods of the third light-extraction gratings in all light-extraction regions are the same, so that light rays of a certain color can be diffracted at a diffraction angle of 0°, and light rays of other colors can be diffracted at a diffraction angle greater than 0°. Further, the fourth light-extraction grating is disposed at the light-emitting side, and diffracts light rays which are diffracted at a diffraction angle greater than 0° by the third light-extraction grating, so as to project the light rays of all colors onto the same preset irradiation area. The relationship between the diffraction angle and the grating period has been given in the above; since the wavelength of each color ray is definite, the periods of the third light-extraction grating and the fourth light-extraction grating as well as positional relationship between the third light-extraction grating and the fourth light-extraction grating can be determined easily.

Compared with the embodiment shown in FIG. 1, the driving method of the display device including the collimation backlight source of this embodiment is simpler. Compared with the display device including the collimation backlight source in the related art, the driving method of the display device including the collimation backlight source of this embodiment only needs to drive in a time-division manner the light sources of different colors in the collimation backlight source to sequentially emit light rays, which are described hereinafter in details.

For convenience of description, the light sources of the collimation backlight source of this embodiment include a red light source, a green light source and a blue light source, thereby realizing color display through red light rays, green light rays and blue light rays. The duration for displaying one frame picture includes a red-image display period, a green-image display period and a blue-image display period.

During the red-image display period in the duration for displaying one frame picture, the red light source is controlled to emit light rays, the third light-extraction grating 50 in each light-extraction region 101 projects, by diffraction at a diffraction angle greater than 0°, red light rays transmitted in the light guide plate onto one matched fourth light-extraction grating 51. This fourth light-extraction grating 51 further diffracts the red light rays and projects the red light rays onto the irradiation area of the corresponding pixel region on the color filter substrate.

During the green-image display period in the duration for displaying one frame picture, the green light source is controlled to emit light rays, the third light-extraction grating 50 in each light-extraction region 101 projects, by diffraction at a diffraction angle of 0°, green light rays transmitted in the light guide plate onto the irradiation area of the corresponding pixel region on the color filter substrate.

During the blue-image display period in the duration for displaying one frame picture, the blue light source is controlled to emit light rays, the third light-extraction grating 50 in each light-extraction region 101 projects, by diffraction at a diffraction angle greater than 0°, blue light rays transmitted in the light guide plate onto another matched fourth light-extraction grating 51. This fourth light-extraction grating 51 further diffracts the blue light rays and projects the blue light rays onto the irradiation area of the corresponding pixel region on the color filter substrate.

In the above driving method, by controlling whether the second liquid crystal in the pixel region is deflected in each display period, the red light rays, the green light rays and the blue light rays may be projected onto the region where the light-shielding pattern of the pixel region is located or the light transmission region around the light-shielding pattern. When the irradiation area is in the region where the light-shielding pattern of the pixel region is located, the pixel region is displaying in dark. When the irradiation area is in the light transmission region around the light-shielding pattern, the pixel region is displaying in a bright state, thereby realizing color display.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A collimation backlight source comprising:
   a light guide plate with a surface and a lateral side adjacent to the surface;
   a plurality of light sources of different colors at the lateral side;
   a light-extraction grating assembly in each of a plurality of light-extraction regions on the surface of the light guide plate,
   wherein the light-extraction grating assembly includes a third light-extraction grating in each light-extraction region; periods of the third light-extraction gratings in all the light-extraction regions are the same,
   wherein the collimation backlight source further includes a second buffer layer covering the third light-extraction grating; a refractive index of the second buffer layer is less than a refractive index of the light guide plate,
   wherein, for each light-extraction region, the third light-extraction grating directly projects by diffraction, the light rays of a certain color transmitted in the light guide plate at a diffraction angle of 0° to a corresponding irradiation area of the light receiving surface by diffraction, and projects the light rays of other color transmitted in the light guide plate at a diffraction angle greater than 0°,
   wherein the light-extraction grating assembly further includes a plurality of fourth light-extraction gratings in each light-extraction region; the fourth light-extraction gratings are on the second buffer layer and at a light-emitting side of the third light-extraction grating,
   wherein periods of the fourth light-extraction gratings in each light-extraction region are different; the third light-extraction grating is a step grating, and the fourth light-extraction grating is a step grating, and
   wherein the fourth light-extraction gratings in each light-extraction region sequentially diffract by diffraction, the light rays of other colors projected at a diffraction angle greater than 0° by the third light-extraction grating, and project the light rays of other colors onto preset irradiation areas.

2. The collimation backlight source according to claim 1, wherein each light-extraction region includes a plurality of spaced light-extraction sub-regions,
   wherein the light-extraction grating assembly includes a first light-extraction grating set in each light-extraction sub-region; the collimation backlight source further includes a first buffer layer covering the first light-extraction grating set; a refractive index of the first buffer layer is less than a refractive index of the light guide plate,
   wherein the first light-extraction grating set in each light-extraction sub-region includes:
      a first electrode and a second electrode on the light guide plate; wherein the first electrodes of adjacent two light-extraction sub-regions are insulated from each other;
      a first light-extraction grating on the first electrode or the second electrode; wherein the first light-extraction grating is between the first electrode and the second electrode, and the first light-extraction grating is a step grating; and
      first liquid crystal filled between the first electrode and the second electrode,
   wherein when the refractive index of the first light-extraction grating is the same as the refractive index of the first liquid crystal, the first light-extraction grating is in a light transmission state, and
   wherein for one light-extraction sub-region, when the refractive index of the first light-extraction grating is different from the refractive index of the first liquid crystal, for any two light-extraction sub-regions in the same light-extraction region, the first light-extraction gratings in the two light-extraction sub-regions project light rays of different colors transmitted in the light guide plate by diffraction.

3. The collimation backlight source according to claim 2, wherein for each light-extraction region, periods of the first light-extraction gratings in all the light-extraction sub-regions are different, and
   wherein for each light-extraction sub-region, when the refractive index of the first light-extraction grating is different from the refractive index of the first liquid crystal, the first light-extraction grating directly projects the light rays of a certain color transmitted in the light guide plate at a diffraction angle of 0° to a corresponding irradiation area of the light receiving surface by diffraction.

4. The collimation backlight source according to claim 2, wherein for each light-extraction region, periods of the first light-extraction gratings in all the light-extraction sub-regions are the same, and
   wherein for one of the light-extraction sub-regions, when the refractive index of the first light-extraction grating is different from the refractive index of the first liquid crystal, the first light-extraction grating directly projects the light rays of a certain color transmitted in the light guide plate at a diffraction angle of 0° to a corresponding irradiation area of the light receiving surface by diffraction; for other ones of the light-extraction sub-regions, when the refractive index of the first light-extraction grating is different from the refractive index of the first liquid crystal, the first light-extraction grating projects the light rays of other color transmitted in the light guide plate at a diffraction angle greater than 0° by diffraction.

5. The collimation backlight source according to claim 4, wherein the light-extraction grating assembly further includes a second light-extraction grating set in each light-extraction region; the second light-extraction grating set is on the first buffer layer and is at a light-emitting side of the first light-extraction grating set,
   wherein the second light-extraction grating set in each light-extraction region includes a plurality of second light-extraction gratings; periods of the second light-extraction gratings are different; the second light-extraction gratings are in other ones of the light-extraction sub-regions in a one-to-one manner; the light rays projected at a diffraction angle greater than 0° by the first light-extraction grating in corresponding light-extraction sub-region, are further diffracted by the second light-extraction grating by diffraction and are projected at a diffraction angle of 0° to a corresponding irradiation area of the light receiving surface, and wherein the second light-extraction grating is a step grating.

6. The collimation backlight source according to claim 2, wherein the first light-extraction grating is composed of a plurality of light-transmission stripes arranged at equal intervals, and space between two adjacent light-transmission stripes is transparent.

7. The collimation backlight source according to claim 2, wherein in the first light-extraction grating set in each light-extraction sub-region, the first light-extraction grating is in the first liquid crystal.

8. The collimation backlight source according to claim 1, wherein the light-extraction grating assembly in each light-extraction region is on a light emitting surface of the light guide plate.

9. A display device comprising:
a display panel; and
a backlight source,
wherein the display panel includes a plurality of pixel regions; the display panel includes a cell defined by an array substrate and a color filter substrate, and second liquid crystal filled between the array substrate and the color filter substrate; each pixel region of the color filter substrate includes a light-shielding pattern and a light transmission region around the light-shielding pattern,
wherein the backlight source adopts the collimation backlight source according to claim 1; light-extraction regions of the backlight source are corresponding to positions of the pixel regions in a one-to-one manner,
wherein the display device further includes:
a controller configured to control the light sources of different colors in the backlight source to emit light rays, and control the light-extraction grating assembly in each light-extraction region to project light rays of all colors transmitted in the light guide plate by diffraction; when the second liquid crystal corresponding to one light-extraction region is not deflected, control the light-extraction grating assembly in the one light-extraction region to project the light rays to a region where the light-shielding pattern of the corresponding pixel region on the color film substrate is located; when the second liquid crystal corresponding to one light-extraction region is deflected, the light rays projected by the light-extraction grating assembly in the one light-extraction region, are adjusted by the second liquid crystal and projected onto the light-transmission region of the corresponding pixel region on the color filter substrate, and then are emitted to a display side.

10. The display device according to claim 9, wherein the light-extraction region includes a plurality of spaced light-extraction sub-regions; the pixel region includes a plurality of sub-pixel regions,
wherein the light-extraction grating assembly includes a first light-extraction grating set in each light-extraction sub-region, and
wherein the controller is configured to, by applying a voltage to a first electrode and a second electrode, control a refractive index of the first liquid crystal in one light-extraction sub-region to be different from a refractive index of light-transmission stripes of the first light-extraction grating, thereby controlling the first light-extraction grating in the one light-extraction sub-region to project light rays of a certain color transmitted in the light guide plate by diffraction; for any two light-extraction sub-regions in the same light-extraction region, control the first light-extraction gratings in the two light-extraction sub-regions to project light rays of different colors transmitted in the light guide plate by diffraction.

11. A driving method of the display device according to claim 9, comprising:
controlling the light sources of different colors in the backlight source to sequentially emit light rays, and controlling the light-extraction grating assembly in each light-extraction region to project light rays of all colors transmitted in the light guide plate by diffraction; when the second liquid crystal corresponding to one light-extraction region is not deflected, controlling the light-extraction grating assembly in the one light-extraction region to project the light rays to a region where the light-shielding pattern of the corresponding pixel region on the color film substrate is located; when the second liquid crystal corresponding to one light-extraction region is deflected, adjusting by the second liquid crystal, the light rays projected by the light-extraction grating assembly in the one light-extraction region, and projecting the adjusted light rays onto the light-transmission region of the corresponding pixel region on the color filter substrate for emitting adjusted light rays to a display side.

12. The driving method according to claim 11, wherein controlling the light-extraction grating assembly in each light-extraction region to project light rays of all colors transmitted in the light guide plate by diffraction, includes:
by applying a voltage to a first electrode and a second electrode, controlling a refractive index of the first liquid crystal in one light-extraction sub-region to be different from a refractive index of the first light-extraction grating, thereby controlling the first light-extraction grating in the one light-extraction sub-region to project light rays of a certain color transmitted in the light guide plate by diffraction; for any two light-extraction sub-regions in the same light-extraction region, controlling the first light-extraction gratings in the two light-extraction sub-regions to project light rays of different colors transmitted in the light guide plate by diffraction.

13. The driving method according to claim 12, wherein the backlight sources include a red light source, a green light source and a blue light source; each light-extraction region includes a red-light-extraction sub-region, a green-light-extraction sub-region and a blue-light-extraction sub-region; each pixel region includes a red sub-pixel region, a green sub-pixel region and a blue sub-pixel region,
wherein a duration for displaying one frame picture includes a red-image display period, a green-image display period and a blue-image display period; the driving method specifically includes:
during the red-image display period in the duration for displaying one frame picture, controlling the red light source to emit light rays, controlling a refractive index of the first liquid crystal in the red-light-extraction sub-region to be different from a refractive index of light-transmission stripes of the first light-extraction grating while controlling a refractive index of the first liquid crystal in the green-light-extraction sub-region and the blue-light-extraction sub-region to be the same as the refractive index of light-transmission stripes of the first light-extraction grating, thereby controlling the first light-extraction grating in the red-light-extraction sub-region to project red light rays transmitted in the light guide plate by diffraction; meanwhile, controlling the second liquid crystal in the red sub-pixel region to deflect, thereby achieving corresponding grayscale display;

during the green-image display period in the duration for displaying one frame picture, controlling the green light source to emit light rays, controlling a refractive index of the first liquid crystal in the green-light-extraction sub-region to be different from the refractive index of light-transmission stripes of the first light-extraction grating while controlling a refractive index of the first liquid crystal in the red-light-extraction sub-region and the blue-light-extraction sub-region to be the same as the refractive index of light-transmission stripes of the first light-extraction grating, thereby controlling the first light-extraction grating in the green-light-extraction sub-region to project green light rays transmitted in the light guide plate by diffraction; and during the blue-image display period in the duration for displaying one frame picture, controlling the blue light source to emit light rays, controlling a refractive index of the first liquid crystal in the blue-light-extraction sub-region to be different from the refractive index of light-transmission stripes of the first light-extraction grating while controlling a refractive index of the first liquid crystal in the red-light-extraction sub-region and the green-light-extraction sub-region to be the same as the refractive index of light-transmission stripes of the first light-extraction grating, thereby controlling the first light-extraction grating in the blue-light-extraction sub-region to project blue light rays transmitted in the light guide plate by diffraction.

14. A collimation backlight source comprising:
a light guide plate with a surface and a lateral side adjacent to the surface;
a plurality of light sources of different colors at the lateral side;
a light-extraction grating assembly in each of a plurality of light-extraction regions on the surface of the light guide plate, each light-extraction region including a plurality of spaced light-extraction sub-regions,
wherein the light-extraction grating assembly includes a first light-extraction grating set in each light-extraction sub-region; the collimation backlight source further includes a first buffer layer covering the first light-extraction grating set; a refractive index of the first buffer layer is less than a refractive index of the light guide plate,
wherein the first light-extraction grating set in each light-extraction sub-region includes:
a first electrode and a second electrode on the light guide plate; wherein the first electrodes of adjacent two light-extraction sub-regions are insulated from each other;
a first light-extraction grating on the first electrode or the second electrode; wherein the first light-extraction grating is between the first electrode and the second electrode, and the first light-extraction grating is a step grating; and
first liquid crystal filled between the first electrode and the second electrode,
wherein when the refractive index of the first light-extraction grating is the same as the refractive index of the first liquid crystal, the first light-extraction grating is in a light transmission state,
wherein for one light-extraction sub-region, when the refractive index of the first light-extraction grating is different from the refractive index of the first liquid crystal, for any two light-extraction sub-regions in the same light-extraction region, the first light-extraction gratings in the two light-extraction sub-regions project light rays of different colors transmitted in the light guide plate by diffraction,
wherein for each light-extraction region, periods of the first light-extraction gratings in all the light-extraction sub-regions are the same,
wherein for one of the light-extraction sub-regions, when the refractive index of the first light-extraction grating is different from the refractive index of the first liquid crystal, the first light-extraction grating directly projects the light rays of a certain color transmitted in the light guide plate at a diffraction angle of 0° to a corresponding irradiation area of the light receiving surface by diffraction; for other ones of the light-extraction sub-regions, when the refractive index of the first light-extraction grating is different from the refractive index of the first liquid crystal, the first light-extraction grating projects the light rays of other color transmitted in the light guide plate at a diffraction angle greater than 0° by diffraction,
wherein the light-extraction grating assembly further includes a second light-extraction grating set in each light-extraction region; the second light-extraction grating set is on the first buffer layer and is at a light-emitting side of the first light-extraction grating set,
wherein the second light-extraction grating set in each light-extraction region includes a plurality of second light-extraction gratings; periods of the second light-extraction gratings are different; the second light-extraction gratings are in other ones of the light-extraction sub-regions in a one-to-one manner; the light rays projected at a diffraction angle greater than 0° by the first light-extraction grating in corresponding light-extraction sub-region, are further diffracted by the second light-extraction grating by diffraction and are projected at a diffraction angle of 0° to a corresponding irradiation area of the light receiving surface, and
wherein the second light-extraction grating is a step grating.

15. A driving method of a display device, wherein the display device comprises a display panel and a backlight source; the display panel includes a plurality of pixel regions; the display panel includes a cell defined by an array substrate and a color filter substrate, and second liquid crystal filled between the array substrate and the color filter substrate; each pixel region of the color filter substrate includes a light-shielding pattern and a light transmission region around the light-shielding pattern,
wherein the backlight source adopts a collimation backlight source, the collimation backlight source includes a light guide plate with a surface and a lateral side adjacent to the surface; a plurality of light sources of different colors at the lateral side; and a light-extraction grating assembly in each of a plurality of light-extraction regions on the surface of the light guide plate; light-extraction regions of the backlight source are corresponding to positions of the pixel regions in a one-to-one manner, wherein the display device further includes a controller configured to control the light sources of different colors in the backlight source to emit light rays, and control the light-extraction grating assembly in each light-extraction region to project light rays of all colors transmitted in the light guide plate by diffraction; when the second liquid crystal corresponding to one light-extraction region is not deflected, control the light-extraction grating assembly in the one light-extraction region to project the light rays to a region where the light-shielding pattern of the corresponding pixel region on the color film substrate is located; when the second liquid crystal corresponding to one light-extraction region is deflected, the light rays projected by the light-extraction grating assembly in the one light-extraction region, are adjusted by the second liquid crystal and projected onto the light-transmission region of the corresponding pixel region on the color filter substrate, and then are emitted to a display side, wherein the driving method comprises controlling the light sources of different colors in the backlight source to sequentially emit light rays, and controlling the light-extraction grating assembly in each light-extraction region to project light rays of all colors transmitted in the light guide plate by diffraction; when the second liquid crystal corresponding to one light-extraction region is not deflected, controlling the light-extraction grating assembly in the one light-extraction region to project the light rays to a region where the light-shielding pattern of the corresponding pixel region on the color film substrate is located; when the second liquid crystal corresponding to one light-extraction region is deflected, adjusting by the second liquid crystal, the light rays projected by the light-extraction grating assembly in the one light-extraction region, and projecting the adjusted light rays onto the light-transmission region of the corresponding pixel region on the color filter substrate for emitting adjusted light rays to a display side, wherein controlling the light-extraction grating assembly in each light-extraction region to project light rays of all colors transmitted in the light guide plate by diffraction, includes by applying a voltage to a first electrode and a second electrode, controlling a refractive index of the first liquid crystal in one light-extraction sub-region to be different from a refractive index of the first light-extraction grating, thereby controlling the first light-extraction grating in the one light-extraction sub-region to project light rays of a certain color transmitted in the light guide plate by diffraction; for any two light-extraction sub-regions in the same light-extraction region, controlling the first light-extraction gratings in the two light-extraction sub-regions to project light rays of different colors transmitted in the light guide plate by diffraction, wherein the backlight sources include a red light source, a green light source and a blue light source; each light-extraction region includes a red-light-extraction sub-region, a green-light-extraction sub-region and a blue-light-extraction sub-region; each pixel region includes a red sub-pixel region, a green sub-pixel region and a blue sub-pixel region, wherein a duration for displaying one frame picture includes a red-image display period, a green-image display period and a blue-image display period; the driving method specifically includes:

during the red-image display period in the duration for displaying one frame picture, controlling the red light source to emit light rays, controlling a refractive index of the first liquid crystal in the red-light-extraction sub-region to be different from a refractive index of light-transmission stripes of the first light-extraction grating while controlling a refractive index of the first liquid crystal in the green-light-extraction sub-region and the blue-light-extraction sub-region to be the same as the refractive index of light-transmission stripes of the first light-extraction grating, thereby controlling the first light-extraction grating in the red-light-extraction sub-region to project red light rays transmitted in the light guide plate by diffraction; meanwhile, controlling the second liquid crystal in the red sub-pixel region to deflect, thereby achieving corresponding grayscale display;

during the green-image display period in the duration for displaying one frame picture, controlling the green light source to emit light rays, controlling a refractive index of the first liquid crystal in the green-light-extraction sub-region to be different from the refractive index of light-transmission stripes of the first light-extraction grating while controlling a refractive index of the first liquid crystal in the red-light-extraction sub-region and the blue-light-extraction sub-region to be the same as the refractive index of light-transmission stripes of the first light-extraction grating, thereby controlling the first light-extraction grating in the green-light-extraction sub-region to project green light rays transmitted in the light guide plate by diffraction; and during the blue-image display period in the duration for displaying one frame picture, controlling the blue light source to emit light rays, controlling a refractive index of the first liquid crystal in the blue-light-extraction sub-region to be different from the refractive index of light-transmission stripes of the first light-extraction grating while controlling a refractive index of the first liquid crystal in the red-light-extraction sub-region and the green-light-extraction sub-region to be the same as the refractive index of light-transmission stripes of the first light-extraction grating, thereby controlling the first light-extraction grating in the blue-light-extraction sub-region to project blue light rays transmitted in the light guide plate by diffraction.

* * * * *